United States Patent Office 3,076,714
Patented Feb. 5, 1963

3,076,714
PROCESS FOR PREPARING A STABLE, EDIBLE COCONUT WATER EXTRACT
Henry E. Wolff, 1027 Belser St., and Arthur F. Abbey, 5441 Opihi St., both of Honolulu, Hawaii
No Drawing. Filed Jan. 6, 1960, Ser. No. 699
4 Claims. (Cl. 99—125)

This invention relates to a process for treating coconut meat and to a product obtained therefrom.

Heretofore coconut extracts have been prepared from desiccated coconut meat or from copra, both of which are different forms of dehydrated coconut. Also certian p:ocesses have prepared an extract of fresh coconut meat and have concentrated this extract to obtain the oil therefrom free from water and albumen.

Also certain processes have been used heretofore which comprise the use of a volatile solvent in extracting certain constituents from coconut. All of these processes fail to obtain a liquid product consisting essentially of water and coconut extract which has the flavoring and the essential oils of natural fresh coconut in a stable water emulsion.

One of the objects of this invention is to so treat the meats of fresh coconuts as to obtain a novel product which is fit for human consumption.

It is a further object of the invention to obtain an emulsified product from coconut meat which emulsion is stable under refrigeration.

The various features of novelty which characterize this invention are pointed out with particularity in the claims annexed to and forming part of this specification. For a better understanding of the invention, however, its advantages and specific objects obtained with its use, reference should be had to the accompanying descriptive matter in which is described a preferred embodiment of the invention.

Fresh coconut meat may be used in the form of either chunks or as shredded with or without the brown material that naturally is found on the outside of the meaty coconut. This brown material is separated automatically as hereinafter described during the process. For a better understanding of the invention the following examples are given, for the purpose of illustration and not to be construed as limitation of the invention disclosed herein.

Example 1

1 lb. 8 oz. to 1 lb. 14 oz. of shredded coconut meat, which includes the brown material attached to the meatt is added to
7 lbs. 12 oz. to 8 lbs. 10 oz. of water
Heated to 150° to 170° F.

The liquid is then separated from the solid material by compressing until all of the liquid has been removed. To the liquid extract is added 4 to 8 oz. of cane sugar and 8 to 12 grams of table salt. The liquid is allowed to stand at 140° F. for approximately ½ hour, after which time the coconut cream will rise to the surface. An emulsifier is then prepared as follows:

3–5 grams of "Span 60" and
3–5 grams of "Tween 60"

are mixed together and warmed over hot water until a clear solution is formed. Then 2 oz. of the coconut cream is separated from the liquid extract and added to the emulsifier. This mixture is then added to the coconut extract referred to above, which has been kept at a temperature of 140° F. This is then homogenized at 4,000 lbs. and then at 500 lbs. in a hcmogenizer. After this treatment the mixture is allowed to stand for approximately 1 hour in a settling tank. The liquid coconut extract is then removed from the brown residual material, which settles to the bottom of the tank. This extract is then cooled as quickly as possible and refrigerated.

Example 2

1 lb. 8 oz. to 1 lb. 14 oz. of shredded coconut meat
which includes the brown material
This is added to 7 lbs. 12 oz. to 8 lbs. 10 oz. of water
Heated to 150° to 170° F.

The mixture is placed in a large blender, such as a Griffith-S-Mincemaster, manufactured in West Germany and distributed by Griffith Laboratories of Chicago. The action of the cutting blades of the machine extracts the milk and oil from the meat and the liquid is removed from the blender by means of suction. The mixture is then run through a strainer to remove the coconut shreds. After the liquid is removed from the strainer it is drawn into a tank wherein the liquid is allowed to settle for 15 to 30 minutes and is maintained at a temperature of between 140° F. and 150° F. until the liquid separates. At this point the coconut cream in the liquid will rise to the top of the tank.

An emulsifier is prepared by mixing 3–5 grams of "Span 60" and 3–5 grams of "Tween 60" over hot water until a clear solution is formed. 2 oz. of the above coconut cream is drawn off and added thereto.

This mixture of coconut cream and emulsifying agent is then added to the body of liquid extract which has been maintained at a temperature of 140° F. This liquid extract is then run through a homogenizer at 4,000 lbs. and recirculated at 500 lbs. After homogenization the liquid is allowed to stand for approximately 1 hr. in a settling tank. The liquid portion is then siphoned from the brown solid material that has settled to the bottom of the tank. This liquid extract is cooled as quickly as possible and retained under refrigeration. An amount of approximately 1 gallon liquid extract is obtained by the above example.

Example 3

1 lb. 8 oz. to 1 lb. 14 oz. of shredded coconut meat
which includes the brown material attached to the meat
7 lbs. 12 oz. to 8 lbs. 10 oz. of water
Heated to 150° to 170° F.

The meat is added to the water at this temperature. This is then placed in a large blender, preferably a Griffith Mincemaster referred to above. To this is added 4 to 8 oz. of cane sugar and 8 to 12 grams of table salt. The action of the cutting blades of the machine extracts the milk and oil protein and natural sugar from the meat. The liquid is removed from the blender and run through a machine operated strainer to remove the residual coconut shreds. After the liquid is removed from the strainer it is drawn into a tank and the liquid is allowed to settle for 15 to 30 minutes at a temperature of 140°–145° F. until the liquid separates. Coconut cream will rise to the top of the tank.

An emulsifier is prepared by mixing 3–5 grams of "Span 60" and 3–5 grams of "Tween 60" over hot water until a clear solution is formed. 2 oz. of the coconut cream, referred to above, is drawn off and added thereto. This is thoroughly mixed and added to the liquid coconut extract which has been kept at a temperature of 140°–150° F. This is then homogenized in a standard homogenizer, first at 4,000 lbs. and then at 500 lbs. After homogenizing the liquid is allowed to stand for approximately 30 minutes to one hour in a settling tank and then the liquid is syphoned off from the brown sediment that accumulates in the bottom of the tank for either bottling, canning, or containerization. However, instead of using a settling tank to remove the brown sediment material a centrifuge may be used. After the material has been packaged it should be refrigerated. This amount of material used in the above example produces 1 gallon of the coconut extract.

*Example 4*

1 lb. 8 oz. to 1 lb. 14 oz. of shredded coconut meat which includes the brown material attached to the meat 7 lbs. 12 oz. to 8 lbs. 10 ozs. of water Water at room temperature The meat is added to the water at this temperature. This is then placed in a large blender, preferably a Griffith Mincemaster referred to above. The action of the cutting blades of the machine extracts the milk and oil protein and natural sugar from the meat. The resultant mixture is then strained, preferably through a machine operated strainer, in order to remove the residual coconut shreds. The liquid is then run through a centrifuge, in order to remove the brown sediment remaining in the liquid. The liquid is then placed in a heating tank, and heated to 140° F. To this is added 4 to 8 oz. of cane sugar and 8 to 12 grams of table salt. After the liquid has been heated ot 140° F., it is allowed to stand for about 15 to 30 minutes until the liquid separates. At this point the coconut cream in the liquid will rise to the top of the tank.

An emulsifier is prepared by mixing 3 to 5 grams of "Span 60" and 3 to 5 grams of "Tween 60" over hot water until a clear solution is formed. 2 oz. of the coconut cream is drawn off and added thereto. This mixture of coconut cream and emulsifying agent is then added to the body of liquid extract which has been maintained at a temperature of 140° F. This liquid extract is then run through a homogenizer at 4,000 lbs. and recirculated at 500 lbs. This liquid extract is cooled as quickly as possible and retained under refrigeraation. An amount of approximately 1 gallon liquid extract is obtained by the above example.

In the above examples the emulsifiers referred to are "Span 60" which is a fatty acid partial ester of hexitol anhydride. "Tween 60" is a polyoxyethylene derivative of partial fatty acid esters of hexitol anhydride.

In the above examples the amount of materials are so adjusted as to give a coconut extract amount of 1 gallon, but it is to be understood that the quantities of the starting materials may be increased in the same ratios to give a geater quantity of the final extract.

While in accordance with the provision of the Statutes there has been illustrated and described the best form of embodiment of this invention, it will be apparent to those skilled in the art that changes may be made in the examples disclosed without departing from the spirit of this invention as set forth in the appended claims, and that in some cases certain features may be used to advantage without a corresponding use of other features.

What is claimed is:

1. A process for preparing a stable, edible coconut water extract which comprises: blending fresh coconut meat with water, heating to 140° F.–145° F., adding thereto a small amount of a mixture of at least one emulsifying agent selected from the group consisting of partial fatty acid esters of hexitol anhydride and a polyoxyethylene derivative of partial fatty acid esters of hexitol anhydride, and homogenizing.

2. A process for preparing a stable edible coconut water extract which comprises: subjecting shredded fresh coconut to the action of water at a temperature of 150° F.–170° F., expressing the water from the shredded coconut, maintaining the liquid at a temperature of about 140° F. to allow the cream to rise, separating a small amount of the cream and admixing therewith a mixture of (1) partial fatty acid esters of hexitol anhydride and (2) a polyoxyethylene derivative of partial fatty acid esters of hexitol anhydride, returning the mixture to the liquid and homogenizing the same.

3. A process for preparing a stable edible coconut water extract which comprises: subjecting the fresh coconut to the action of water; blending the same, maintaining the blended liquid at a temperature of 140° F. to 145° F. until there is a separation, removing a small amount of coconut cream, adding thereto a small amount of a mixture of (1) partial fatty acid esters of hexitol anhydride and (2) a polyoxyethylene derivative of partial fatty acid esters of hexitol anhydride, returning this mixture to the liquid and homogenizing.

4. A process for preparing a stable edible coconut water extract which comprises: subjecting the fresh coconut to the action of water at a temperautre of 150° F.–170° F.; blending the same, maintaining the blended liquid at a temperature of 140° F. to 145° F. until there is a separation, removing a small amount of coconut cream, adding thereto a small amount of a mixture of (1) partial fatty acid esters of hexitol anhydride and (2) a polyoxyethylene derivative of partial fatty acid esters of hexitol anhydride, returning this mixture to the said liquid, and homogenizing.

References Cited in the file of this patent

UNITED STATES PATENTS

| | | |
|---|---|---|
| 1,374,879 | Cookson | Apr. 12, 1921 |
| 2,398,950 | Moore | Apr. 23, 1946 |
| 2,422,486 | Johnston | June 17, 1947 |
| 2,910,364 | Powley | Oct. 27, 1959 |
| 2,941,888 | Dolman | June 21, 1960 |